US012762559B2

(12) United States Patent
Kerr et al.

(10) Patent No.: US 12,762,559 B2
(45) Date of Patent: Oct. 13, 2026

(54) PAYMENTS FEDERATED DIRECTORY

(71) Applicant: Capital One Financial Corporation, McLean, VA (US)

(72) Inventors: Micah J. Kerr, Westerville, OH (US); Alexander Jay Nathan, Highland Park, IL (US); Julie Malikayil, Colorado Springs, CO (US); Michael D. Hansen, Houston, TX (US)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 18/535,999

(22) Filed: Dec. 11, 2023

(65) Prior Publication Data

US 2024/0220986 A1 Jul. 4, 2024

Related U.S. Application Data

(63) Continuation of application No. 16/584,108, filed on Sep. 26, 2019, now Pat. No. 11,842,346.

(51) Int. Cl.

*G06Q 20/40* (2012.01)
*G06Q 20/02* (2012.01)
*G06Q 20/38* (2012.01)

(52) U.S. Cl.

CPC ......... *G06Q 20/4014* (2013.01); *G06Q 20/02* (2013.01); *G06Q 20/3821* (2013.01); (Continued)

(58) Field of Classification Search

CPC ............... G06Q 20/4014; G06Q 20/02; G06Q 20/3821; G06Q 20/40; G06Q 20/401; (Continued)

(56) References Cited

U.S. PATENT DOCUMENTS 5,970,475 A * 10/1999 Barnes ............... G06Q 30/0641 705/26.81
7,228,291 B2 6/2007 Seamons et al.
(Continued)

FOREIGN PATENT DOCUMENTS

WO 9919819 A1 4/1999

OTHER PUBLICATIONS

Lutz et al., A survey of Payment Approaches for Identity Federations in Focus of the SAML Technology, 2013, IEEE Communications Surveys & Tutorials, vol. 15 No. 4, 4th quarter 2013, pp. 1979-1999 (Year: 2013).*

*Primary Examiner* — Yingying Zhou
(74) *Attorney, Agent, or Firm* — Lee Sullivan Shea & Smith LLP

(57) ABSTRACT

Embodiments provide a methods and systems for securely providing access to sensitive information for a plurality of entities. The method includes receiving, by a payer credential service provider (CSP), from a payer, a request for payee electronically protected information (EPI). The payer CSP transmits to a payee CSP a request for payee EPI data. The payee CSP validates, using a distributed ledger system, whether the payer has permission to request the payee EPI. The payer CSP receives the payee EPI data from the payee CSP. The payer CSP sends the payee EPI data to the payer.

20 Claims, 7 Drawing Sheets

(52) U.S. Cl.
CPC ........... *G06Q 20/40* (2013.01); *G06Q 20/401* (2013.01); *G06Q 2220/00* (2013.01)

(58) Field of Classification Search
CPC ... G06Q 2220/00; H04L 9/50; H04L 2209/56; H04L 9/3239; G06F 21/14
See application file for complete search history.

(56) References Cited

U.S. PATENT DOCUMENTS

| | | | | |
|---|---|---|---|---|
| 8,280,788 | B2 * | 10/2012 | Perlman | G06Q 20/405 705/40 |
| 10,778,603 | B2 * | 9/2020 | Tabares | H04L 67/562 |
| 10,956,973 | B1 | 3/2021 | Chang | |
| 10,984,413 | B2 * | 4/2021 | Armstrong | H04L 63/0442 |
| 11,546,173 | B2 * | 1/2023 | Chen | H04L 63/0876 |
| 11,568,397 | B2 * | 1/2023 | Poteet, III | G06Q 20/3829 |
| 11,983,290 | B2 * | 5/2024 | Andreina | G06F 21/6218 |
| 12,159,268 | B2 * | 12/2024 | Pati | G06Q 40/04 |
| 12,254,463 | B1 * | 3/2025 | Hecht | G06Q 20/401 |
| 2003/0208684 | A1 | 11/2003 | Camacho et al. | |
| 2005/0267842 | A1 * | 12/2005 | Weichert | G06Q 40/04 705/40 |
| 2007/0282743 | A1 | 12/2007 | Lovelett et al. | |
| 2008/0059367 | A1 | 3/2008 | Anuszewski et al. | |
| 2008/0120238 | A1 | 5/2008 | Flitcroft et al. | |
| 2008/0222046 | A1 | 9/2008 | Mclsaac et al. | |
| 2010/0057578 | A1 | 3/2010 | Blair et al. | |
| 2011/0213707 | A1 * | 9/2011 | Jackson | G06Q 20/40 707/769 |
| 2012/0089516 | A1 * | 4/2012 | Tian | G06Q 20/10 235/379 |
| 2013/0290177 | A1 | 10/2013 | Milam et al. | |
| 2015/0379487 | A1 | 12/2015 | Stewart et al. | |
| 2017/0048216 | A1 * | 2/2017 | Chow | G06Q 20/401 |
| 2017/0243209 | A1 * | 8/2017 | Johnsrud | H04M 15/854 |
| 2018/0247302 | A1 * | 8/2018 | Armstrong | G06Q 20/389 |
| 2018/0262335 | A1 | 9/2018 | Bergner et al. | |
| 2018/0276666 | A1 | 9/2018 | Haldenby et al. | |
| 2019/0028278 | A1 * | 1/2019 | Gilson | H04L 9/3239 |
| 2019/0132138 | A1 | 5/2019 | Finlow-Bates et al. | |
| 2019/0173854 | A1 * | 6/2019 | Beck | H04L 67/10 |
| 2019/0243986 | A1 | 8/2019 | Uhr et al. | |
| 2020/0042992 | A1 | 2/2020 | Zhang | |
| 2020/0272767 | A1 * | 8/2020 | Dunjic | G06F 21/64 |
| 2020/0342394 | A1 * | 10/2020 | Moore | G06Q 20/0655 |
| 2021/0014060 | A1 * | 1/2021 | Georgiadis | G06Q 20/3829 |
| 2021/0075623 | A1 | 3/2021 | Petersen | |
| 2021/0365918 | A1 | 11/2021 | Showalter | |

* cited by examiner

PAYMENTS FEDERATED DIRECTORY

CROSS-REFERENCE TO RELATED APPLICATIONS

This application claims priority to, and is a continuation of, U.S. application Ser. No. 16/584,108, filed Sep. 26, 2019, and titled "Payments Federated Directory," the contents of which are incorporated herein by reference in their entirety.

BACKGROUND OF THE INVENTION

Payers and payees, such as business payers and business payees conducting business to business (B2B) transactions, must exchange numerous types of sensitive data. For example, in some transactions, payers and payees must exchange tax information and bank account information.

Traditionally, payers and payees directly exchanged such information. This depending on the number of payees and payers an entity engages with, this can be burdensome and is error prone. Each time a new payer or payee is added or changes its information, the entity must carefully track the new information.

Alternatively, some business services may track the information using a centralized database containing all of the sensitive data. This is also error prone and relies on only one centralized business service. One existing model is a B2B payment network. These networks are proprietary, permissioned access directories. In order to access the list of payees, you must be part of the payment network. The vetting of payees varies from B2B payment network but is almost always stored in a centralized directory. Another existing model is the consortium wherein all payee data is stored in a centralized database and is closed access. B2B payment networks, including the consortium model, are permissioned for payers and payees.

B2B payments are difficult to efficiently maintain. Businesses struggle to gather the required payment information when onboarding vendors, to keep up-to-date records of payment information, and to ensure the proper remittance is included for cash application. When a payee updates their payment information, it is their duty to reach out to all points of contact to manually update their payment information. This inefficient process can lead to missed or delayed payments and leads to a lack of trust and secure access to business payment information.

BRIEF SUMMARY OF THE INVENTION

In one embodiment, the invention provides a method of securely providing access to sensitive information for a plurality of entities. The method includes receiving, by a payer credential service provider (CSP), from a payer, a request for payee electronically protected information (EPI). The payer CSP transmits to a payee CSP a request for payee EPI data. The payee CSP validates, using a distributed ledger system, whether the payer has permission to request the payee EPI. The payer CSP receives the payee EPI data from the payee CSP. The payer CSP sends the payee EPI data to the payer.

In another embodiment, a payer credential service provider (CSP) is provided. The CSP comprises a processor and a non-transitory computer readable memory storing instructions, that when executed by the processor, cause the CSP to perform a method. The method includes receiving, by a payer credential service provider (CSP), from a payer, a request for payee electronically protected information (EPI).

The payer CSP transmits to a payee CSP a request for payee EPI data. The payee CSP validates, using a distributed ledger system, whether the payer has permission to request the payee EPI. The payer CSP receives the payee EPI data from the payee CSP. The payer CSP sends the payee EPI data to the payer.

In yet another embodiment, a non-transitory computer readable medium storing instructions, that when executed by a processor cause the processor to perform a method, is provided. The method includes receiving, by a payer credential service provider (CSP), from a payer, a request for payee electronically protected information (EPI). The payer CSP transmits to a payee CSP a request for payee EPI data. The payee CSP validates, using a distributed ledger system, whether the payer has permission to request the payee EPI. The payer CSP receives the payee EPI data from the payee CSP. The payer CSP sends the payee EPI data to the payer.

DETAILED DESCRIPTION OF THE INVENTION

Embodiments of the invention provide a distributed ledger system, such as a blockchain-based solution, for a distributed directory of trusted and/or verified partners within the commercial payments ecosystem. In one embodiment, business entities can store and share corporate payment and remittance information in a permissioned manner through the directory. Embodiments allow the directory allows businesses to add, maintain, and control access to their payment information through a federated system. Further, the directory allows businesses to search, retrieve, and subscribe to other businesses' payment information thus simplifying complex onboarding processes.

The distributed ledger system uses blockchain technology to enable privacy and confidentiality on permissioned networks. Previous solutions required high administrative time without providing a high level of robustness and confidentiality.

The distributed ledger system includes the hashing of payment data. Rather than using a centralized database containing all of the sensitive data, a distributed ledger, such as blockchain, is utilized to store public information about a company and a hash (a secure, one-way reference) of any sensitive data. Credential Service Providers (CSPs), operate as a trusted entity and are responsible for storing the sensitive data off-chain. The CSPs may perform full due diligence on the information including bank account information for any payees.

The directory provides the ability for payers to have full control over entities that can access their payment data through a permission-controlled system validated by the participating CSPs. These elements and processes create a more efficient platform for CSPs, payers, and payees to interact and conduct business. According to an embodiment, the business payments federated directory (BPFD) distributed ledger is proprietary and permissioned for the Credential Service Providers.

Figure 1:
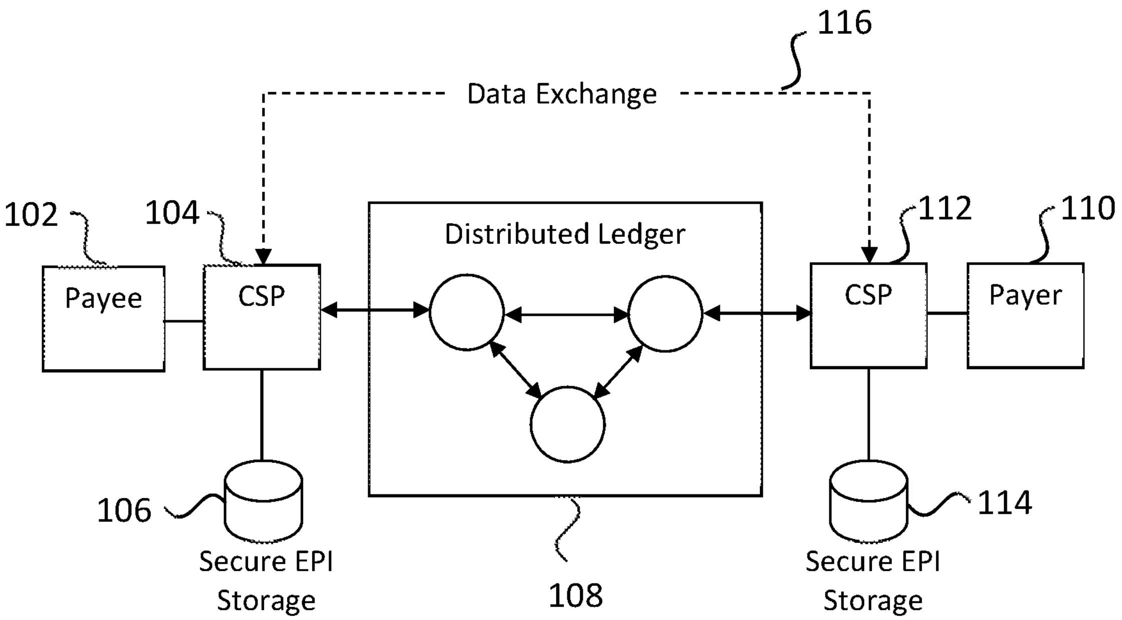
FIG. 1 provides a system for the exchange of sensitive information according to an embodiment.

FIG. 1 provides a system for the exchange of sensitive information according to an embodiment of a business payments federated directory. In the illustrated embodiment, payee 102 and payer 110 need to exchange information. For example, payee 102 and payer 110 may be conducting business to business (B2B) transactions and payer 110 may need access to payee 102 sensitive information, such as tax information and bank account information. Information such as tax information and bank account information may be required in order to complete a B2B transaction.

In the illustrated embodiment, payee 102 uses a credential service provider (CSP) 104 to facilitate the exchange of sensitive information. The CSP 104 places certain information, such as the name of the payee 102 into the distributed ledger 108. Sensitive information, such as the payee 102 tax information and bank account information are stored by the CSP 104 in secure electronically protected information (EPI) datastore 106. A hash of the EPI is then stored on the distributed ledger 108.

Payer 110 also uses a credential service provider 112. While the illustrated embodiment shows two credential service providers, payee 102 and payer 110 may also use the same CSP. In a system with many payee and payers, there would by various CSPs. Some payees and payers may use the same CSP while other payees and payers use different CSPs. Each CSP may be a node in the distributed ledger 108.

The CSP 112 places certain information, such as the name of the payer 110 into the distributed ledger 108. In an embodiment, sensitive information, such as the payer 110 tax information and bank account information, if provided, are stored by the CSP 112 in secure electronically protected information (EPI) datastore 114. Depending on the transaction, payer 110 may become a payee. Conversely, payee 102 may become a payer depending on the transaction.

As described in more detail below, payer 110 can request sensitive information about payee 102. The request is made through CSP 112. CSP 112 provides basic information as needed from the distributed ledger 108. The CSP 112 also requests sensitive information from the CSP 104. CSP 112 verifies that payer 110 has permission to access the sensitive information by validating access using a permissions access list stored in the distributed ledger 108. If the payer 110 has permission, CSP 104 obtains the sensitive information from datastore 106 and transmits the sensitive information over a secure communication channel 116. The secure communication channel 116 may be a public network and the sensitive information may be encrypted to send over the communication channel 116. CSP 112 receives the sensitive information, verifies the data validity against the hash from the distributed ledger 108, and transmits all required information to payer 110.

Figure 2:
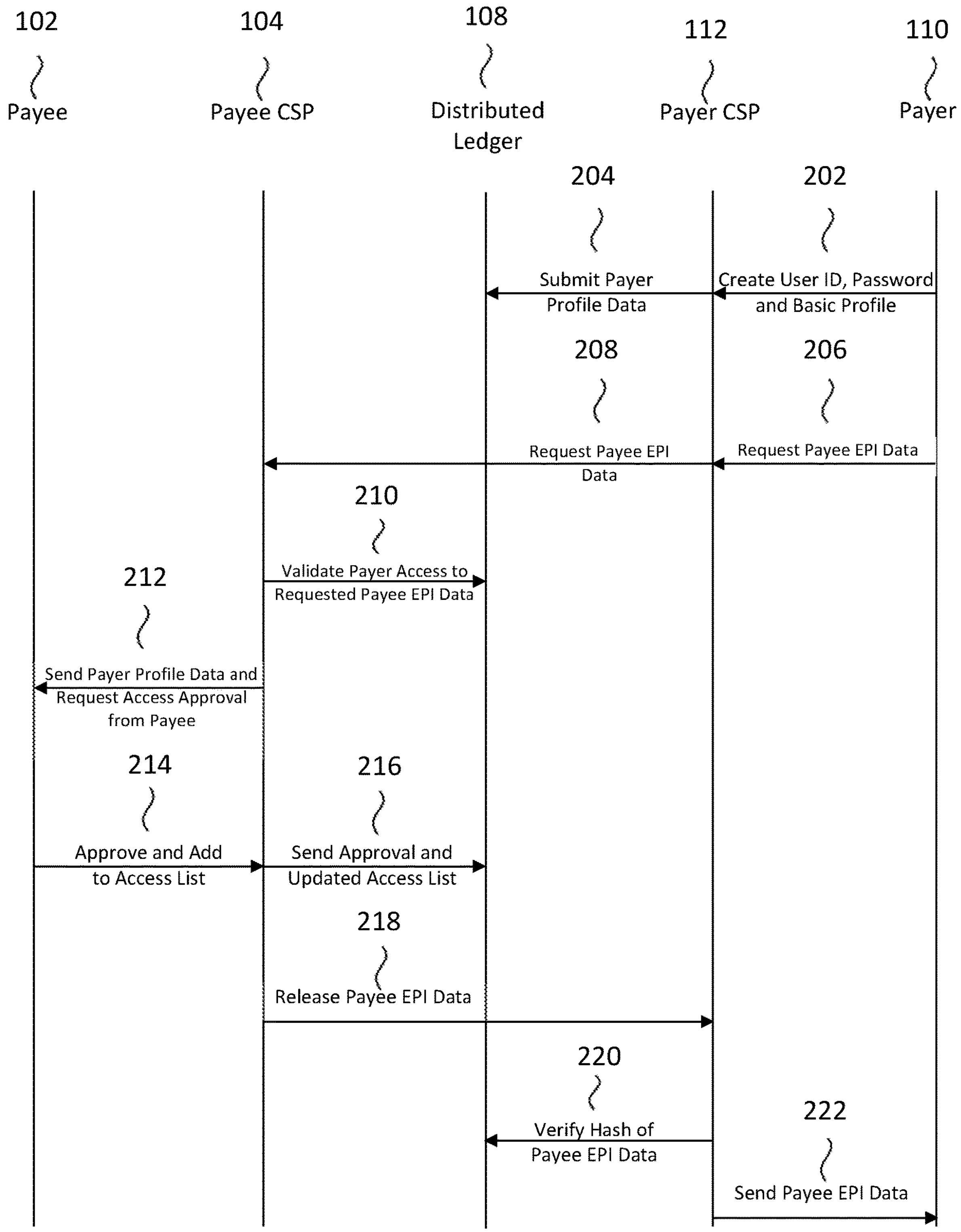
FIG. 2 provides a sequence diagram for exchanging sensitive payment information according to an embodiment.

FIG. 2 provides a sequence diagram for exchanging sensitive payment information according to an embodiment. In the illustrated embodiment, payer 110 creates an account in the business payments federated directory. For example, at 202 the payer 110 sends the payer CSP 112 information to establish an account, such as user ID, password, and basic profile information. At 204, the payer CSP 112 submits the payer 110 profile data to the distributed ledger system 108. Additionally, as described above, the payer 110 may submit sensitive information to the CSP 112 for storage in the datastore 114 (FIG. 1).

After establishing an account, the payer 110 can then request payee 102 electronically protected information (EPI) at step 206. The request is made from the payer 110 to the payer CSP 112. At 208, the payer CSP 112 submits the request to CSP 104 over the secure communication channel 116. For example, the CSP may be a node in the distributed ledger 108. A CSP can also access the distributed ledger 108 through another CSP that is acting as a master node that provides access to other CSPs.

At 210, payee CSP 104 verifies that the payer 110 has permission to access the payee 102 electronically protected information (EPI) using the distributed ledger 108. If it is determined that access is needed, at 212, the payee CSP 104 sends the payer 110 profile data and a request for access approval to the payee 102. At 214, the payee either approves or does not approve the request for access. In the illustrated embodiment, at 214, the request is approved and permission to add the payer 110 to an approved access list is provided to the payee CSP 104. At 216, the payee CSP 104 sends approval and updates the access list in the distributed ledger 108. At 218 the payee EPI data is sent to the payer CSP 112 over the secure communication channel 116 (FIG. 1). The payer CSP 112 then verifies the validity of the EPI data at 220. In the illustrated embodiment, at 222, the EPI data is validated and payer CSP 112 sends the payee EPI data to the payer 110.

Figure 3:
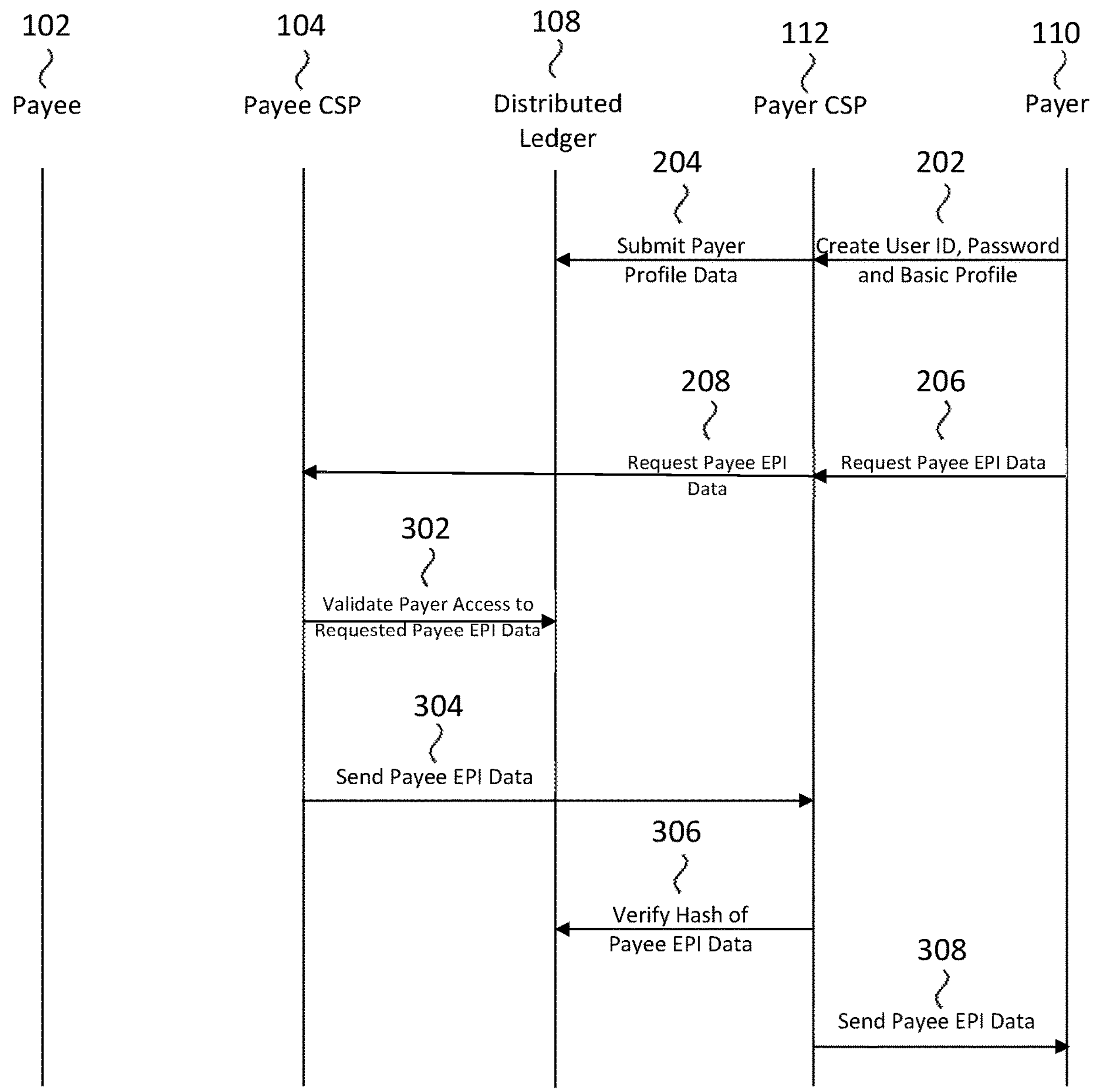
FIG. 3 provides a sequence diagram for exchanging sensitive payment information according to an embodiment.

FIG. 3 provides a sequence diagram for exchanging sensitive payment information according to an embodiment. Similar to the embodiment described with respect to FIG. 2, payer 110 creates an account in the business payments federated directory. For example, at 202 the payer 110 sends the payer CSP 112 information to establish an account, such as user ID, password, and basic profile information. At 204, the payer CSP 112 submits the payer 110 profile data to the distributed ledger system 108. Additionally, as described above, the payer 110 may submit sensitive information to the CSP 112 for storage in the datastore 114 (FIG. 1). If the payer 110 already has an account, then steps 202 and 204 are not needed.

As described above, after establishing an account, the payer 110 can then request payee 102 electronically protected information (EPI) at step 206. The request is made from the payer 110 to the payer CSP 112. At 208, the payer CSP 112 submits the request to CSP 104 over the secure communication channel 116 (FIG. 1). For example, the CSP may be a node in the distributed ledger 108. A CSP can also access the distributed ledger 108 through another CSP that is acting as a master node that provides access to other CSPs.

At 302, CSP 104 verifies that the payer 110 has permission to access the payee 102 electronically protected information (EPI) using the distributed ledger 108. If it is determined that access is allowed, at 304, the payee CSP 104 sends the payee 102 EPI data to the payer CSP 112 over the secure communication channel 116 (FIG. 1). The payer CSP 112 then verifies the validity of the EPI data at 306. In the illustrated embodiment, at 308, the EPI data is validated and payer CSP 112 then provides the payee 102 EPI data to the payer 110.

Figure 4:
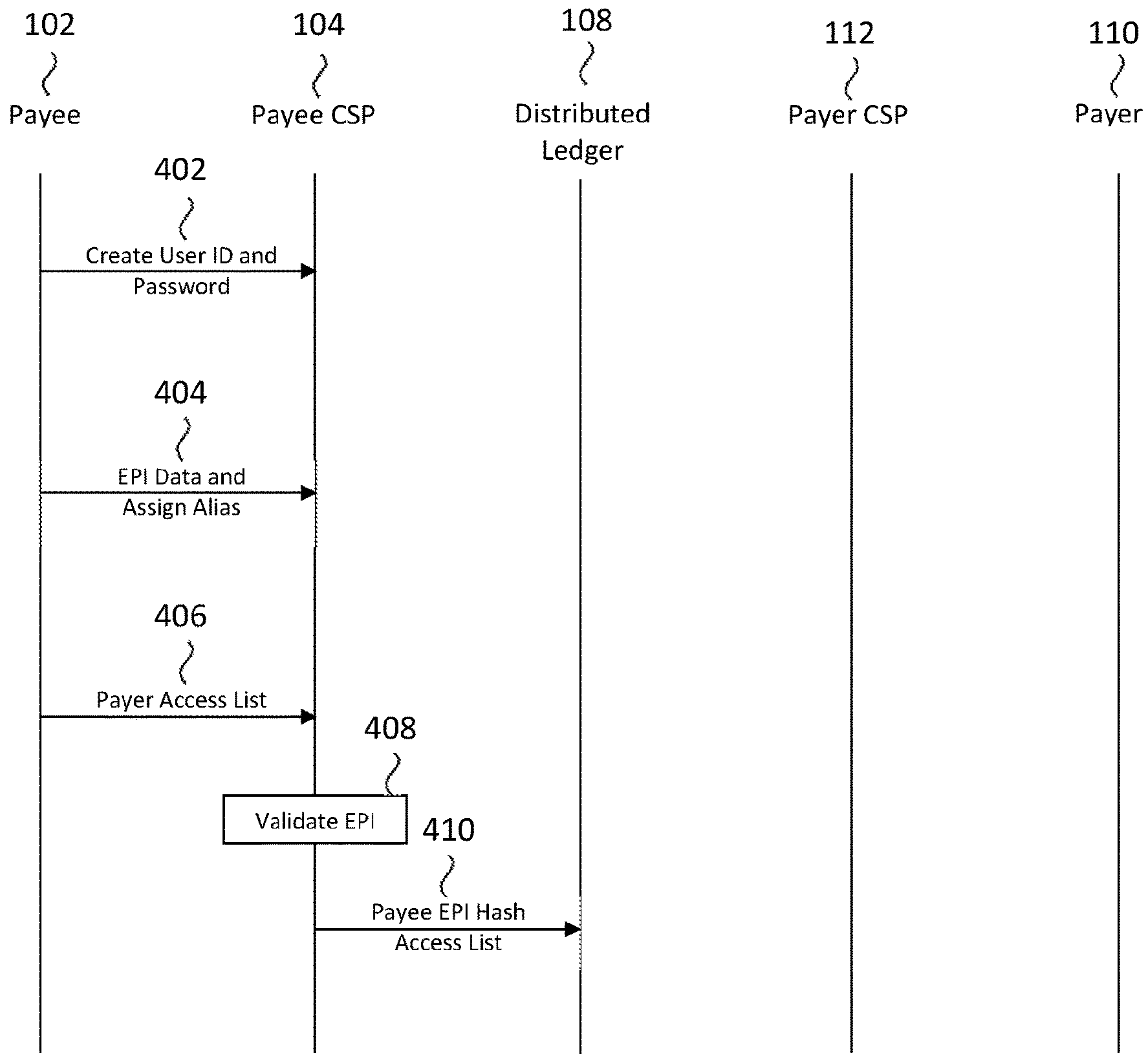
FIG. 4 provides a sequence diagram for providing access to sensitive payment information according to an embodiment.

FIG. 4 provides a sequence diagram for providing access to sensitive payment information according to an embodiment. In this embodiment, payee 102 establishes a new account in the federated directory. At 402, the payee 102 sends the payer CSP 104 information to establish an account, such as user ID, password, and basic profile information. At 404, the payee 102, send EPI data to the payee CSP 104, and may assign an alias. At 406, the payee 102 sends a payer access list to the payee CSP 104. In some embodiments, individual payers that the payee 102 wants to provide access to are sent to the CSP 104. The CSP 104 can then create or modify an access list for the payee 102. At 408, the payee CSP 104 validates the EPI data provided by the payee 102. The payee CSP 104 then saves a hash of the payee 102 EPI data to the distributed ledger 108 at 410. In some embodiments, the payee CSP 104 also saves the access list in the distributed ledger 108.

Figure 5:
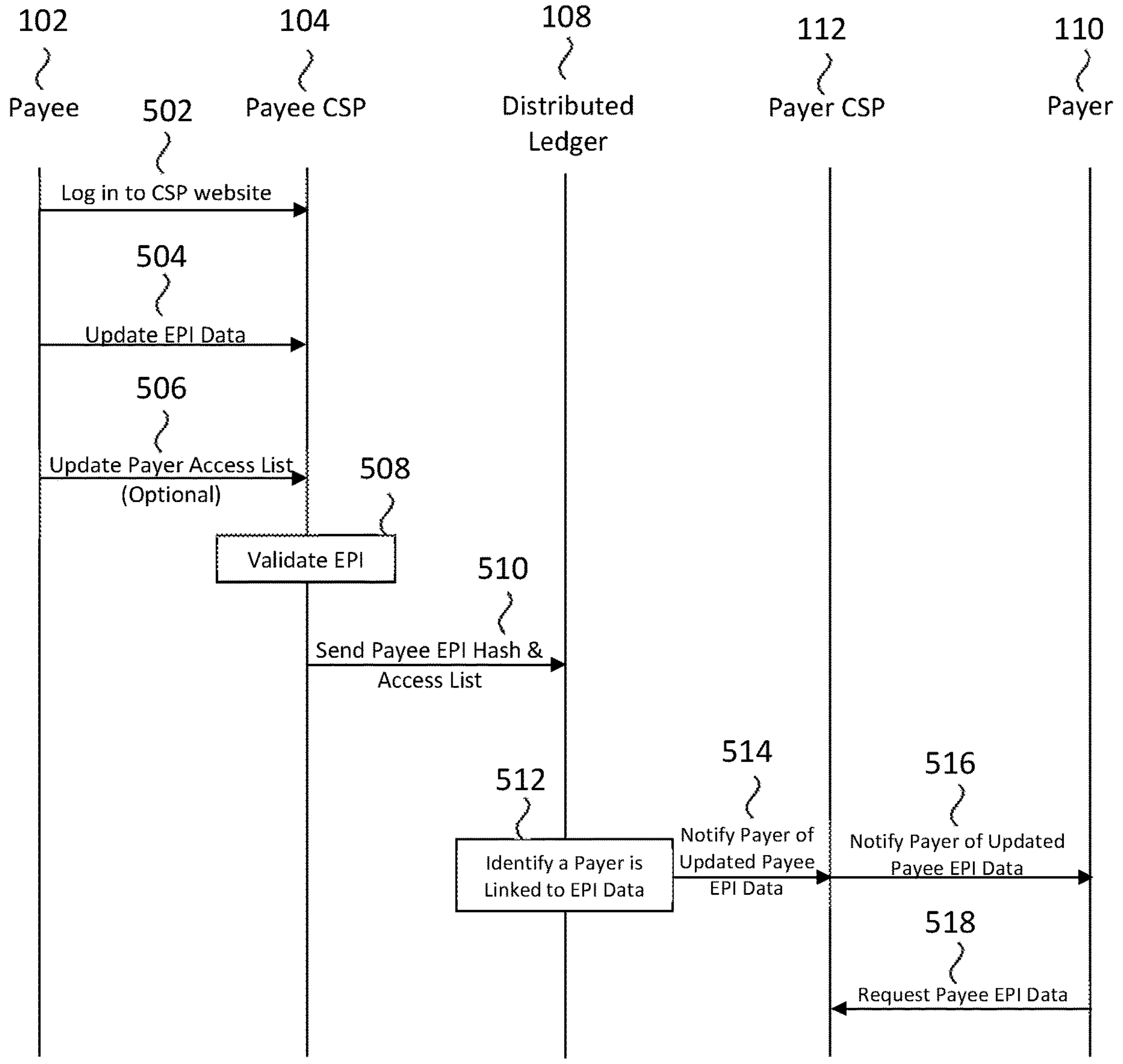
FIG. 5 provides a sequence diagram for providing access to sensitive payment information according to an embodiment.

FIG. 5 provides a sequence diagram for providing access to sensitive payment information according to an embodiment. For example, a payee may provide access to updated EPI data. At 502, the payee 102 accesses the payee CSP 104. In one embodiment, the payee 102 may access the payee CSP 104 by logging into a CSP website or other communication modalities. At 504, the payee 102 provides updated EPI data to the payee CSP 104. At 506, the payee may also update its payer access list, as described above. Payers can be added or removed from the access list. This step is only necessary if there are updates to be made to the payer access list.

At 508, the payee CSP 104 validates the EPI data provided by the payee 102. At 510, the payee CSP 104 stores a hash of the payee EPI data and the access list, if it has been updated, in the distributed ledger 108. A payer 110 linked to the updated EPI data is identified. This can be done, for example, identifying each payer on a payee's access list. The identification can be done by the payer CSP 112 when it receives updated information from the distributed ledger 112 at step 514. At step 516 the payer CSP 112 notifies the payer 110 of the updated payee 102 EPI data. At 518, the payer 110 can then request the updated payee EPI data from the payer CSP 112.

Figure 6:
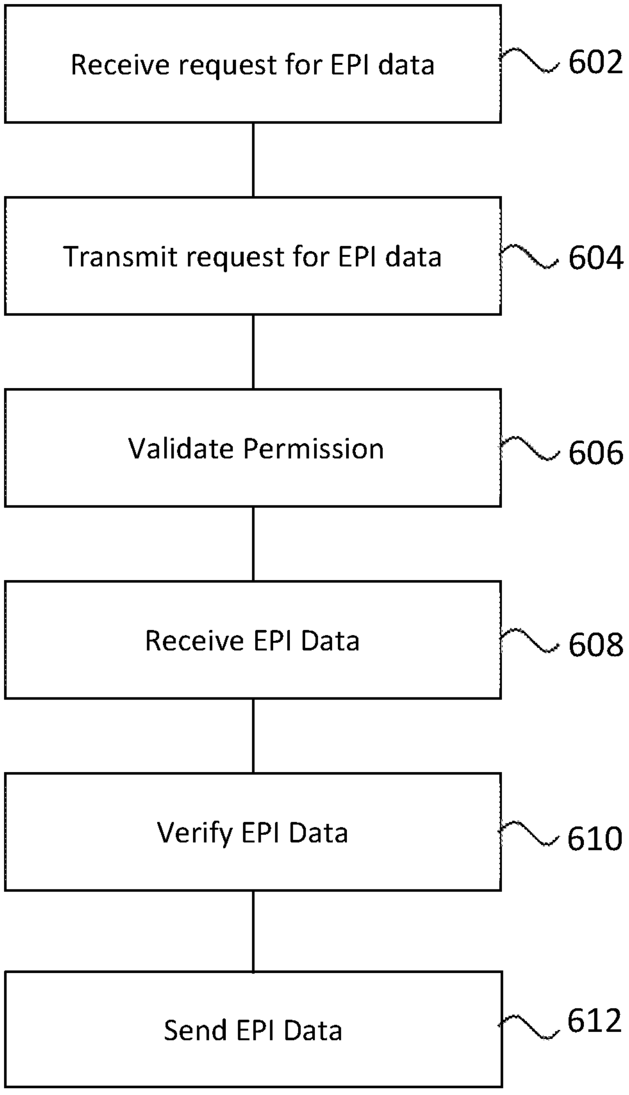
FIG. 6 is a flow diagram for providing sensitive payment information according to an embodiment.

FIG. 6 is a flow diagram for providing sensitive payment information according to an embodiment. The diagram illustrates a method of securely providing access to sensitive information for a plurality of entities. At step 602, a payer credential service provider (CSP) receives a request from a payer, for payee electronically protected information (EPI). At step 604, the payer CSP transmits to a payee CSP, a request for payee EPI. The payee CSP validates, using a distributed ledger system, whether the payer has permission to request the payee EPI at step 606. If the payer has permission to receive the EPI data, then at step 608, the payer CSP receives payee EPI data from the payee CSP. At step 610, the payer CSP verifies the EPI data against the hash stored on the distributed ledger then sends the payee EPI data to the payer in step 612. After receiving the payee EPI data, the payer 110 can then make a payment to the payee 102. Payment can be made using information in the EPI data. The payment can be made through traditional payment channels or can be made through the distributed ledger system 108.

Figure 7:
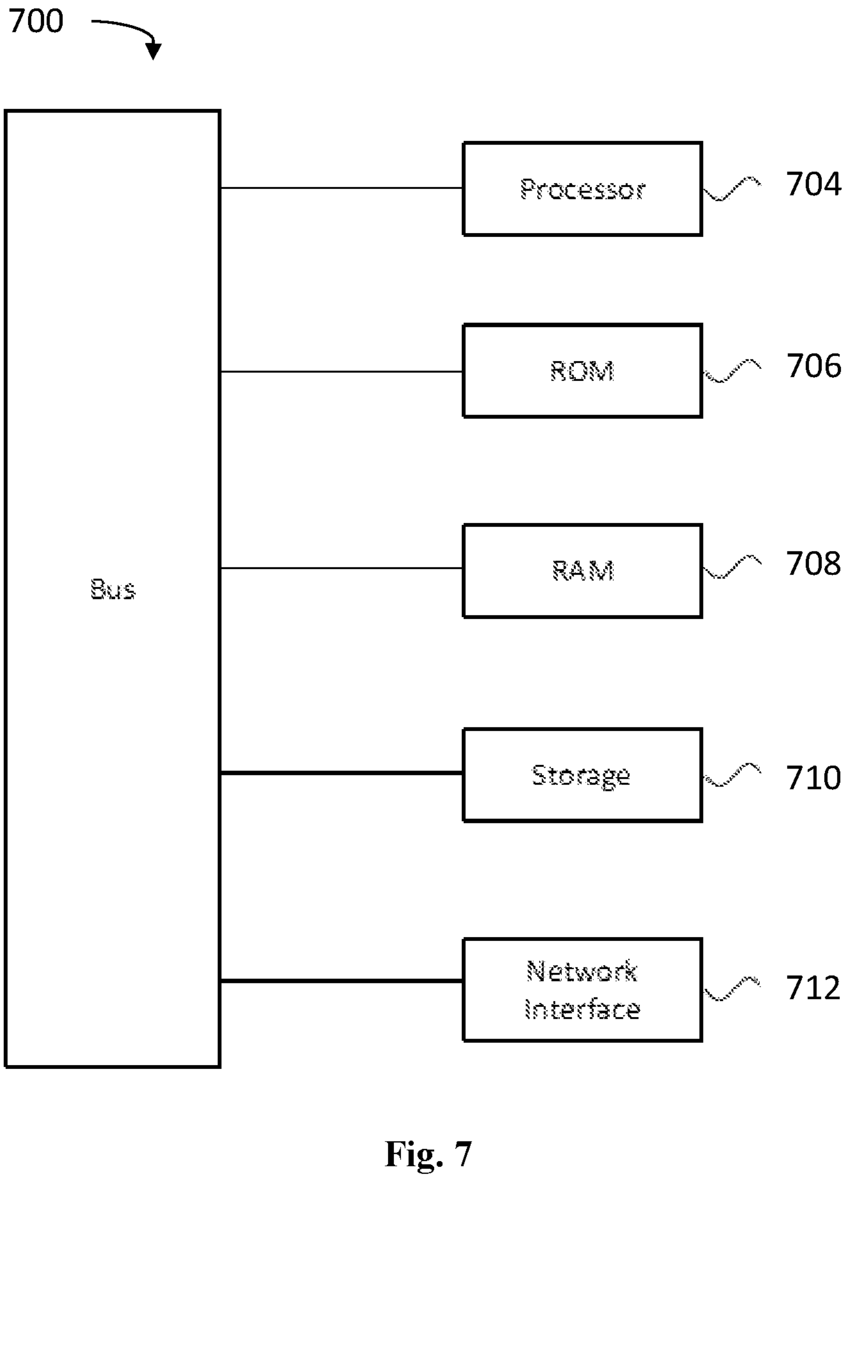
FIG. 7 is a block diagram of a processing system according to an embodiment.

FIG. 7 is block diagram of a processing system according to an embodiment. The processing system includes a processor 704, such as a central processing unit (CPU), executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the internet.

The processing device of FIG. 7 can be used to implement the methods and systems described above. For example, each CSP may comprise one or more processing systems. Similarly, each payer and payee may have one or more processing systems to interface with the CSP systems and carry out the described methods. Each node in the blockchain can also comprise one or more processing systems.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A first credential service provider (CSP) that is configured to operate within a distributed network architecture as a first node of a permissioned, blockchain-based distributed ledger network, the first CSP comprising:

at least one network interface;

at least one processor;

at least one non-transitory computer-readable medium;

program instructions stored on the at least one non-transitory computer-readable medium that, when executed by the at least one processor, cause the first CSP to:

provide a web-based user portal that enables a given payee to access the first CSP;

receive, via the at least one network interface, (i) payee electronically protected information (EPI) of the given payee and (ii) payer access data indicating one or more payers that have been approved to access the payee EPI, wherein the payee EPI comprises at least one of tax information or bank account information of the given payee, and wherein the payee EPI and the payer access data were entered by the given payee through the web-based user portal;

based on receiving the payee EPI:

(i) store the payee EPI of the given payee in a secure data store that is private to the first CSP and off of the permissioned, blockchain-based distributed ledger network;

(ii) generate a hash that comprises a secure, one-way reference to the payee EPI; and (iii) record the hash on the permissioned, blockchain-based distributed ledger network such that the hash is accessible by other CSPs that are configured to operate within the distributed network architecture as nodes of the permissioned, blockchain-based distributed ledger network, wherein recording the hash on the permissioned, blockchain-based distributed ledger network enables independent validation of the payee EPI by the other CSPs without centralized storage of the payee EPI;

based on receiving the payer access data, record, on the permissioned, blockchain-based distributed ledger network, an indication that the one or more payers are permitted to access the payee EPI of the given payee;

receive from a second CSP that is configured to operate within the distributed network architecture as a second node of the permissioned, blockchain-based distributed ledger network over a secure communication channel between the second CSP and the first CSP established through the at least one network interface that is separate from the permissioned, blockchain-based distributed ledger network, a request by a given payer for the payee EPI of the given payee, wherein the given payer is included in the one or more payers that have been approved to access the payee EPI; and after receiving the request for the payee EPI of the given payee, verify that the given payer has permission to access the payee EPI of the given payee by using permissioned, the blockchain-based distributed ledger network; and based on verifying that the given payer has permission to access the payee EPI of the given payee, (i) obtain the payee EPI of the given payee from the secure data store that is private to the first CSP and off of the permissioned, blockchain-based distributed ledger network, (ii) encrypt the payee EPI of the given payee, and (iii) transmit to the second CSP, over the secure communication channel established through the at least one network interface that is separate from the permissioned, blockchain-based distributed ledger network, the encrypted payee EPI of the given payee, wherein the second CSP thereafter validates the payee EPI against the hash that was previously recorded on the permissioned, blockchain-based distributed ledger network before sending the payee EPI to the given payer.

2. The first CSP of claim 1, further comprising program instructions stored on the at least one non-transitory computer-readable medium that, when executed by the at least one processor, cause the first CSP to:

after receiving the payer access data indicating one or more payers that have been approved to access the payee EPI, generate an access list comprising the payer access data, wherein the program instructions that, when executed by the at least one processor, cause the first CSP to record, on the permissioned, blockchain-based distributed ledger network, the indication that the one or more payers are permitted to access the payee EPI of the given payee comprise program instructions that, when executed by the at least one processor, cause the first CSP to:

record, on the permissioned, blockchain-based distributed ledger network, the indication that the one or more payers are permitted to access the payee EPI of the given payee as part of the access list, and wherein the program instructions that, when executed by the at least one processor, cause the first CSP to verify that the given payer has permission to access the payee EPI of the given payee by using the permissioned, blockchain-based distributed ledger network comprise program instructions that, when executed by the at least one processor, cause the first CSP to:

verify that the given payer has permission to access the payee EPI of the given payee by using the access list that is accessible on the permissioned, blockchain-based distributed ledger network.

3. The first CSP of claim 1, further comprising program instructions stored on the at least one non-transitory computer-readable medium that, when executed by the at least one processor, cause the first CSP to:

prior to storing the payee EPI of the given payee in the secure data store that is private to the first CSP and off of the permissioned, blockchain-based distributed ledger network, validate the payee EPI of the given payee.

4. The first CSP of claim 1, further comprising program instructions stored on the at least one non-transitory computer-readable medium that, when executed by the at least one processor, cause the first CSP to:

receive updated payee EPI of the given payee;

based on receiving the updated payee EPI:

(i) store the updated payee EPI of the given payee in the secure data store that is private to the first CSP and off of the permissioned, blockchain-based distributed ledger network; and (ii) store generate an updated hash that comprises a secure, one-way reference to the updated payee EPI; and (iii) record the updated hash on the permissioned, blockchain-based distributed ledger network such that the updated hash is accessible by the other CSPs that are configured to operate within the distributed network architecture as nodes of the permissioned, blockchain-based distributed ledger network.

5. The first CSP of claim 1, wherein the program instructions that, when executed by the at least one processor, cause the first CSP to receive the payer access data indicating the one or more payers that have permission to access the payee EPI comprise program instructions that, when executed by the at least one processor, cause the first CSP to receive the payer access data as part of an access list indicating the one or more payers that have been approved to access the payee EPI of the given payee, wherein the program instructions that, when executed by the at least one processor, cause the first CSP to record, on the permissioned, blockchain-based distributed ledger network, the indication that the one or more payers are permitted to access the payee EPI of the given payee comprise program instructions that, when executed by the at least one processor, cause the first CSP to record, on the permissioned, blockchain-based distributed ledger network, the indication that the one or more payers are permitted to access the payee EPI of the given payee as part of the access list, wherein the program instructions that, when executed by the at least one processor, cause the first CSP to verify that the given payer has permission to access the payee EPI of the given payee comprise program instructions that, when executed by the at least one processor, cause the first CSP to verify that the given payer has permission to access the payee EPI of the given payee by using the access list that is accessible on the permissioned, blockchain-based distributed ledger network.

6. The first CSP of claim 1, further comprising program instructions stored on the at least one non-transitory computer-readable medium that, when executed by the at least one processor, cause the first CSP to:

prior to receiving the payee EPI of the given payee, establish a federated directory account for the given payee.

7. The first CSP of claim 1, wherein the given payer is a first payer, and wherein the first CSP further comprises program instructions stored on the at least one non-transitory computer-readable medium that, when executed by the at least one processor, cause the first CSP to:

receive from the second CSP that is configured to operate within the distributed network architecture as the second node of the permissioned, blockchain-based distributed ledger network over the secure communication channel between the second CSP and the first CSP established through the at least one network interface that is separate from the permissioned, blockchain-based distributed ledger network, a second request by a second payer for the payee EPI of the given payee;

after receiving the second request by the second payer for the payee EPI of the given payee, determine that the second payer does not have permission to access the payee EPI of the given payee by using the permissioned, blockchain-based distributed ledger network; and based on the determination that the second payer does not have permission to access the payee EPI of the given payee:

obtain, from the given payee, approval for the second payer to access the payee EPI of the given payee;

record, on the permissioned, blockchain-based distributed ledger network, an indication that the second payer has permission to access the payee EPI of the given payee;

obtain the payee EPI of the given payee from the secure data store that is private to the first CSP and off of the permissioned, blockchain-based distributed ledger network; and transmit to the second CSP, over the secure communication channel established through the at least one network interface that is separate from the permissioned, blockchain-based distributed ledger network, a response to the second request comprising the payee EPI of the given payee, wherein the second CSP thereafter validates the payee EPI against the hash that was previously recorded on the permissioned, blockchain-based distributed ledger network before sending the payee EPI to the second payer.

8. The first CSP of claim 7, wherein the approval for the second payer to access the payee EPI of the given payee is obtained by:

sending, via the at least one network interface, the given payee a request to grant the second payer permission to access the payee EPI of the given payee; and receiving, from the given payee via the at least one network interface, an approval of the request to grant the second payer permission to access the payee EPI of the given payee.

9. The first CSP of claim 7, further comprising program instructions stored on the at least one non-transitory computer-readable medium that, when executed by the at least one processor, cause the first CSP to:

prior to transmitting the response to the second request comprising the payee EPI of the given payee to the second CSP over the secure communication channel established through the at least one network interface that is separate from the permissioned, blockchain-based distributed ledger network, encrypt the payee EPI of the given payee.

10. A non-transitory computer readable medium storing executable instructions for a first credential service provider (CSP) that is configured to operate within a distributed network architecture as a first node of a permissioned, blockchain-based distributed ledger network, wherein the executable instructions, when executed by at least one processor of the first CSP, cause the first CSP to perform functions comprising:

providing a web-based user portal that enables a given payee to access the first CSP;

receiving, via at least one network interface, (i) payee electronically protected information (EPI) of a given payee and (ii) payer access data indicating one or more payers that have been approved to access the payee EPI, wherein the payee EPI comprises at least one of tax information or bank account information of the given payee, and wherein the payee EPI and the payer access data were entered by the given payee through the web-based user portal;

based on receiving the payee EPI:

(i) storing the payee EPI of the given payee in a secure data store that is private to the first CSP and off of the permissioned, blockchain-based distributed ledger network;

(ii) generating a hash that comprises a secure, one-way reference to the payee EPI; and (iii) recording the hash on the permissioned, blockchain-based distributed ledger network such that the hash is accessible by a other CSPs that are configured to operate within the distributed network architecture as nodes of the permissioned, blockchain-based distributed ledger network, wherein recording the hash on the permissioned, blockchain-based distributed 6 ledger network enables independent validation of the payee EPI by the other CSPs without centralized storage of the payee EPI;

based on receiving the payer access data, recording, on the permissioned, blockchain-based distributed ledger network, an indication that the one or more payers are permitted to access the payee EPI of the given payee;

receiving, from a second CSP that is configured to operate within the distributed network architecture as a second node of the permissioned, blockchain-based distributed ledger network over a secure communication channel between the second CSP and the first CSP established through the at least one network interface that is separate from the permissioned, blockchain-based distributed ledger network, a request by a given payer for the payee EPI of the given payee, wherein the given payer is included in the one or more payers that have been approved to access the payee EPI; and after receiving the request for the payee EPI of the given payee, verifying that the given payer has permission to access the payee EPI of the given payee by using the permissioned, blockchain-based distributed ledger network; and based on verifying that the given payer has permission to access the payee EPI of the given payee, (i) obtaining the payee EPI of the given payee from the secure data store that is private to the first CSP and off of the permissioned, blockchain-based distributed ledger network, (ii) encrypting the payee EPI of the given payee, and (iii) transmitting to the second CSP, over the secure communication channel established through the at least one network interface that is separate from the permissioned, blockchain-based distributed ledger network, the encrypted payee EPI of the given payee, wherein the second CSP thereafter validates the payee EPI against the hash that was previously recorded on the permissioned, blockchain-based distributed ledger network before sending the payee EPI to the given payer.

11. The non-transitory computer readable medium of claim 10, wherein the executable instructions, when executed by the at least one processor of the first CSP, cause the first CSP to perform further functions comprising:

after receiving the payer access data indicating one or more payers that have been approved to access the payee EPI, generating an access list comprising the payer access data, wherein recording, on the permissioned, blockchain-based distributed ledger network, the indication that the one or more payers are permitted to access the payee EPI of the given payee comprises:

recording, on the permissioned, blockchain-based distributed ledger network, the indication that the one or more payers are permitted to access the payee EPI of the given payee as part of the access list, and wherein verifying that the given payer has permission to access the payee EPI of the given payee by using the permissioned, blockchain-based distributed ledger network comprises:

verifying that the given payer has permission to access the payee EPI of the given payee by using the access list that is accessible on the permissioned, blockchain-based distributed ledger network.

12. The non-transitory computer readable medium of claim 10, wherein verifying that the given payer has permission to access the payee EPI of the given payee by using the permissioned, blockchain-based distributed ledger network comprises:

sending, via the at least one network interface, the given payee a request to grant the given payer permission to access the payee EPI of the given payee; and receiving, from the given payee via the at least one network interface, an approval of the request to grant the given payer permission to access the payee EPI of the given payee.

13. The non-transitory computer readable medium of claim 10, wherein the executable instructions, when executed by the at least one processor of the first CSP, cause the first CSP to perform further functions comprising:

receiving updated payee EPI of the given payee; and based on receiving the updated payee EPI:

(1) storing the updated payee EPI of the given payee in the secure data store that is private to the first CSP and off of the permissioned, blockchain-based distributed ledger network;

(ii) generating an updated hash that comprises a secure, one-way reference to the updated payee EPI; and (iii) recording the updated hash on the permissioned, blockchain-based distributed ledger network such that the updated hash is accessible by the other CSPs that are configured to operate within the distributed network architecture as nodes of the permissioned, blockchain-based distributed ledger network.

14. A method carried out by a first credential service provider (CSP) that is configured to operate within a distributed network architecture as a first node of a permissioned, blockchain-based distributed ledger network, the method comprising:

providing a web-based user portal that enables a given payee to access the first CSP;

receiving, via at least one network interface, (i) payee electronically protected information (EPI) of the given payee and (ii) payer access data indicating one or more payers that have been approved to access the payee EPI, wherein the payee EPI comprises at least one of tax information or bank account information of the given payee, and wherein the payee EPI and the payer access data were entered by the given payee through the web-based user portal;

based on receiving the payee EPI:

(i) storing the payee EPI of the given payee in a secure data store that is private to the first CSP and off of the permissioned, blockchain-based distributed ledger network;

(ii) generating a hash that comprises a secure, one-way reference to the payee EPI; and (iii) recording the hash on the permissioned, blockchain-based distributed ledger network such that the hash is accessible by other CSPs that are configured to operate within the distributed network architecture as nodes of the permissioned, blockchain-based distributed ledger network, wherein recording the hash on the permissioned, blockchain-based distributed ledger network enables independent validation of the payee EPI by the other CSPs without centralized storage of the payee EPI;

based on receiving the payer access data, recording, on the permissioned, blockchain-based distributed ledger network, an indication that the one or more payers are permitted to access the payee EPI of the given payee;

receiving from a second CSP that is configured to operate within the distributed network architecture as a second node of the permissioned, blockchain-based distributed ledger network over a secure communication channel between the second CSP and the first CSP established through the at least one network interface that is separate from the permissioned, blockchain-based distributed ledger network, a request by a given payer for the payee EPI of the given payee, wherein the given payer is included in the one or more payers that have been approved to access the payee EPI; and after receiving the request for the payee EPI of the given payee, verifying that the given payer has permission to access the payee EPI of the given payee by using the permissioned, blockchain-based distributed ledger; and based on verifying that the given payer has permission to access the payee EPI of the given payee, (i) obtaining the payee EPI of the given payee from the secure data store that is private to the first CSP and off of the permissioned, blockchain-based distributed ledger network, (ii) encrypting the payee EPI of the given payee, and (iii) transmitting to the second CSP, over the secure communication channel established through the at least one network interface that is separate from the permissioned, blockchain-based distributed ledger network, the encrypted payee EPI of the given payee, wherein the second CSP thereafter validates the payee EPI against the hash that was previously recorded on the permissioned, blockchain-based distributed ledger network before sending the payee EPI to the given payer.

15. The method of claim 14, further comprising:

after receiving the payer access data indicating one or more payers that have been approved to access the payee EPI, generating an access list comprising the payer access data, wherein recording, on the permissioned, blockchain-based distributed ledger network, the indication that the one or more payers are permitted to access the payee EPI of the given payee comprises recording, on the permissioned, blockchain-based distributed ledger network, the indication that the one or more payers are permitted to access the payee EPI of the given payee as part of the access list, and wherein verifying that the given payer has permission to access the payee EPI of the given payee by using the permissioned, blockchain-based distributed ledger network comprises verifying that the given payer has permission to access the payee EPI of the given payee by using the access list that is accessible on the permissioned, blockchain-based distributed ledger network.

16. The method of claim 14, further comprising:

receiving updated payee EPI of the given payee; and based on receiving the updated payee EPI:

(i) storing the updated payee EPI of the given payee in the secure data store that is private to the first CSP and off of the permissioned, blockchain-based distributed ledger network;

(ii) generating an updated hash that comprises a secure, one-way reference to the updated payee EPI; and (iii) recording the updated hash on the permissioned, blockchain-based distributed ledger network such that the updated hash is accessible by the payer other CSPs that are configured to operate within the distributed network architecture as nodes of the permissioned, blockchain-based distributed ledger network.

17. The method of claim 14, wherein:

receiving the payer access data indicating the one or more payers that have permission to access the payee EPI comprises receiving the payer access data as part of an access list that indicates the one or more payers that have been approved to access the payee EPI of the given payee;

recording, on the permissioned, blockchain-based distributed ledger network, the indication that the one or more payers are permitted to access the payee EPI of the given payee comprises recording, on the permissioned, blockchain-based distributed ledger network, the indication that the one or more payers are permitted to access the payee EPI of the given payee as part of the access list; and verifying that the given payer has permission to access the payee EPI of the given payee by using the permissioned, blockchain-based distributed ledger network comprises verifying that the given payer has permission to access the payee EPI of the given payee by using the access list that is accessible on the permissioned, blockchain-based distributed ledger network.

18. The method of claim 14, further comprising:

prior to receiving the payee EPI of the given payee, establishing a federated directory account for the given payee.

19. The method of claim 14, wherein the given payer is a first payer, the method further comprising:

receiving from the second CSP that is configured to operate within the distributed network architecture as the second node of the permissioned, blockchain-based distributed ledger network over the secure communication channel between the second CSP and the first CSP established through the at least one network interface that is separate from the permissioned, blockchain-based distributed ledger network, a second request by a second payer for the payee EPI of the given payee;

after receiving the second request by the second payer for the payee EPI of the given payee, determining that the second payer does not have permission to access the payee EPI of the given payee by using the permissioned, blockchain-based distributed ledger network; and based on the determination that the second payer does not have permission to access the payee EPI of the given payee:

obtaining, from the given payee, approval for the second payer to access the payee EPI of the given payee;

recording, on the permissioned, blockchain-based distributed ledger network, an indication that the second payer has permission to access the payee EPI of the given payee;

obtaining the payee EPI of the given payee from the secure data store that is private to the first CSP and off of the permissioned, blockchain-based distributed ledger network; and transmitting to the second CSP, over the secure communication channel established through the at least one network interface that is separate from the permissioned, blockchain-based distributed ledger network, a response to the second request comprising the payee EPI of the given payee, wherein the second CSP thereafter validates the payee EPI against the hash that was previously recorded on the permissioned, blockchain-based distributed ledger network before sending the payee EPI to the second payer.

20. The method of claim 19, wherein the approval for the second payer to access the payee EPI of the given payee is obtained by:

sending, via the at least one network interface, the given payee a request to grant the second payer permission to access the payee EPI of the given payee; and receiving, from the given payee via the at least one network interface, an approval of the request to grant the second payer permission to access the payee EPI of the given payee.

* * * * *